(12) United States Patent
Dambricourt

(10) Patent No.: US 7,381,455 B2
(45) Date of Patent: Jun. 3, 2008

(54) FLEXIBLE TUBE, RESISTANT TO STRESS CRACKING AND IMPERMEABLE TO WATER VAPOR

(75) Inventor: Géry Dambricourt, Escoutoux (FR)

(73) Assignee: CEP Industrie, St. Remy sur Durolle (FR)

( * ) Notice: Subject to any disclaimer, the term of this patent is extended or adjusted under 35 U.S.C. 154(b) by 98 days.

(21) Appl. No.: 11/298,592

(22) Filed: Dec. 12, 2005

(65) Prior Publication Data

US 2007/0082160 A1    Apr. 12, 2007

Related U.S. Application Data

(63) Continuation of application No. 10/221,728, filed as application No. PCT/FR01/00800 on Mar. 16, 2001, now abandoned.

(30) Foreign Application Priority Data

Mar. 17, 2000    (FR) ................... 00 03469

(51) Int. Cl.
| | |
|---|---|
| B32B 1/08 | (2006.01) |
| B65D 1/02 | (2006.01) |
| B65D 35/08 | (2006.01) |
| C08L 23/08 | (2006.01) |
| B29C 45/04 | (2006.01) |
| B29C 45/38 | (2006.01) |
| B29C 45/40 | (2006.01) |
| B29C 45/43 | (2006.01) |
| B29C 45/67 | (2006.01) |

(52) U.S. Cl. ............... 428/36.9; 428/35.7; 428/36.92; 222/107; 222/215; 525/240; 425/577; 264/513; 264/328.1; 264/335

(58) Field of Classification Search ............... 428/35.7, 428/36.92, 36.9; 222/107, 215; 525/240; 425/577; 264/513, 328.1, 335
See application file for complete search history.

(56) References Cited

U.S. PATENT DOCUMENTS

| | | | |
|---|---|---|---|
| 4,959,005 | A | 9/1990 | Sorensen |
| 5,174,941 | A | 12/1992 | Sorensen |
| 5,677,383 | A | 10/1997 | Chum et al. |
| 5,928,740 | A | 7/1999 | Wilhoit et al. |
| 6,032,800 | A | 3/2000 | Kocher |
| 6,124,008 | A | 9/2000 | Barre |
| 6,297,323 | B1 | 10/2001 | Bauer et al. |
| 6,538,070 | B1 | 3/2003 | Cardwell et al. |
| 6,723,398 | B1 | 4/2004 | Chum et al. |
| 2001/0046606 | A1 | 11/2001 | Tau et al. |

FOREIGN PATENT DOCUMENTS

| | | |
|---|---|---|
| EP | 0595220 | 5/1994 |
| EP | 0856554 | 8/1998 |
| FR | 2764230 | 12/1998 |

*Primary Examiner*—Alicia Chevalier
*Assistant Examiner*—Christoher P Bruenjes
(74) *Attorney, Agent, or Firm*—Leydig, Voit & Mayer, Ltd.

(57) ABSTRACT

The invention concerns a tube comprising a wall made of $C_4$-$C_{10}$ linear ethylene-olefin copolymer or a mixture of $C_4$-$C_{10}$ linear ethylene-olefin copolymer having a melt index ranging between 3 and 10 g/mn, and a density ranging between 0.880 g/cm$^3$ and 0.935 g/cm$^3$ inclusive. The skirt has a mid-height wall thickness ranging between 0.30 and 10 mm inclusive, and a length between 40 and 200 mm inclusive. Furthermore, the skirt and the dispensing head are made in a single injection molding operation in an injection mold. The invention is useful for making tube-like packages.

23 Claims, 5 Drawing Sheets

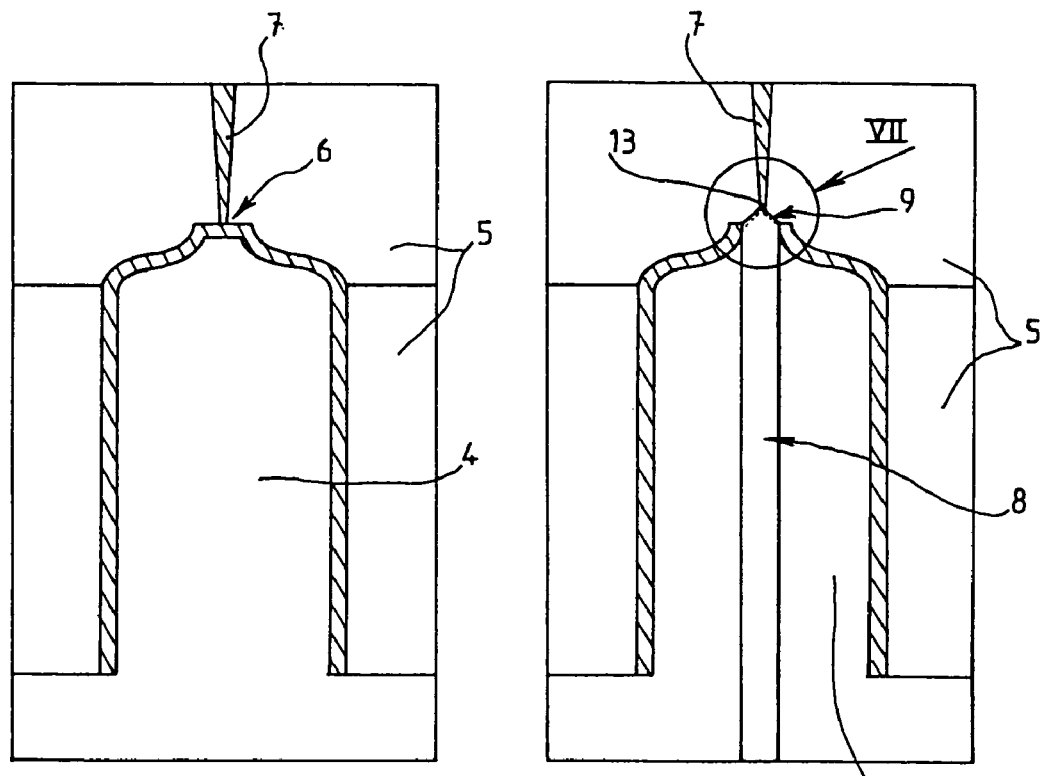
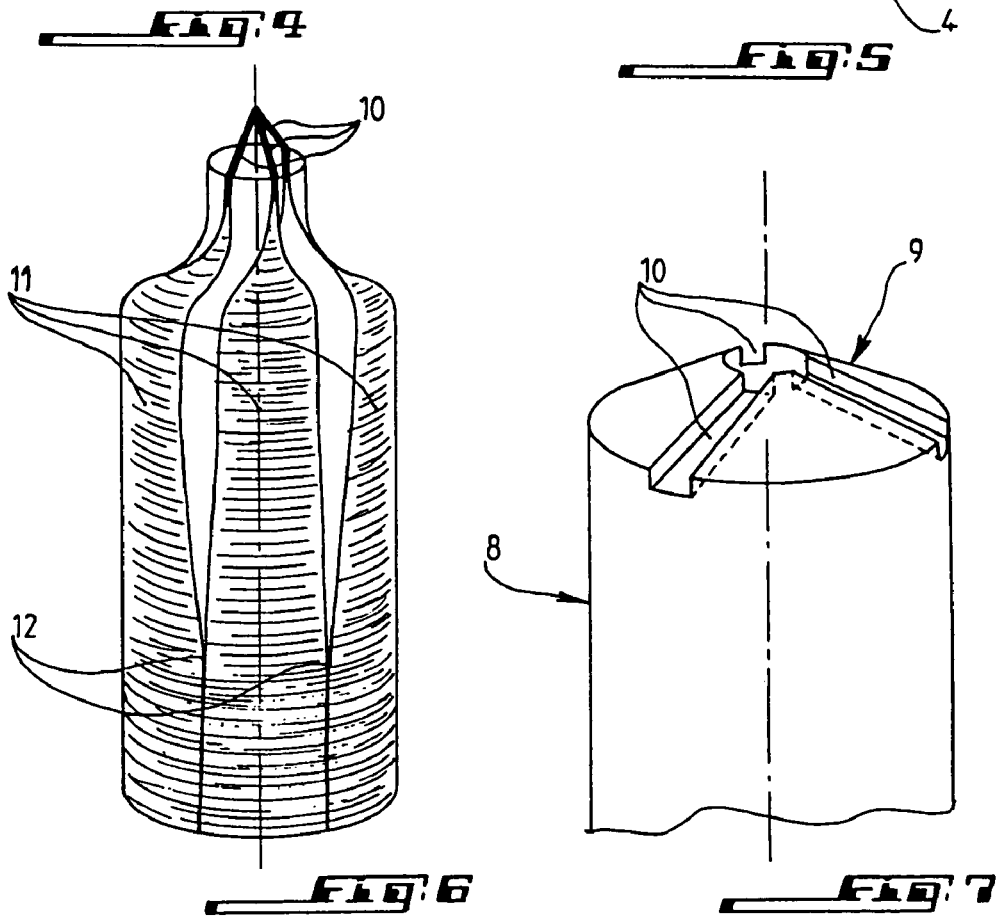

FLEXIBLE TUBE, RESISTANT TO STRESS CRACKING AND IMPERMEABLE TO WATER VAPOR

CROSS-REFERENCE TO RELATED APPLICATIONS

This application is a continuation of U.S. application Ser. No. 10/221,728, which was filed on Dec. 5, 2002, now abandoned, and which entered the United States national phase from International Application No. PCT/FR01/00800, which was filed on Mar. 16, 2001, and which claimed priority of French Application No. 00/03469, which was filed Mar. 17, 2000, all of which are incorporated herein in their entirety and for any and all purposes by reference.

The invention relates to a package, in particular to a flexible tube, which is resistant to stress cracking and impermeable to water-vapor.

Pasty substances, such as tooth pastes, pharmaceutical products, cosmetology products, food products, hygiene products, dentifrices, cleaning products, fatty products, greases, mastics and glues, are often offered in packages of the tube type. These tubes are made up of a tubular body of constant cross section, of circular, oval or other shape. The tubular body, which forms what is called the "skirt" in the following, has a first end generally closed by heat fusing and a second opposite end configured so as to form a head for distribution of the products contained in the skirt. The distribution head is provided with a screwed, snapped or other closing device, of standard cap, service cap or other type.

In order to extract the product from the tube, the consumer presses the wall of the skirt, which undergoes increasing pronounced deformation and folding as the tube is emptied.

The skirt of the tube must therefore be produced out of a flexible material. This material must also be capable of heat fusing. It must also have characteristics of resistance to stress cracking and impermeability to water vapor in order to meet the specifications of compatibility of the products which are intended to be packaged in the tube.

Currently, the tubes which meet all these criteria are most often manufactured by assembling or duplicate molding of the distribution head produced by injection and the skirt produced by extrusion. Another process, little used and expensive, consists of forming the skirt by displacement of the mold cavity following injection of the head, process called injection blow molding.

EP 0 856 554-A describes an injected packaging with improved resistance to stress cracking, which has a wall consisting of a thermoplastic mixture containing a first ethylene-$C_4$ to $C_5$ olefin copolymer and a second ethylene-$C_6$ to $C_{10}$ olefin copolymer. It is specified in this document that the mixture of these two copolymers must have a high fluidity index (standard ISO 1133) on the order of 10 g/10 min in order to be suitable for injection molding of objects with a wall of small thickness, hence the use in the mixture of an ethylene-$C_4$ to $C_5$ olefin copolymer with an MFI between 10 and 20 g/10 min, which is a material which is not resistant to stress cracking according to the specifications generally required. Furthermore, this document is silent as to the properties of flexibility of the tube as a function of the thickness of the wall and as to the properties of impermeability of the wall to water vapor.

In this context, the invention aims to provide a tube produced by the injection process which is at the same time flexible, resistant to stress cracking and impermeable to water, whereas these characteristics are incompatible with the injection process according to prior art when they are simultaneously required.

To this effect, the invention proposes a tube made up of a skirt and a distribution head, characterized by the fact that its wall is made of an ethylene-linear $C_{4\ to\ 10}$ olefin copolymer or of a mixture of ethylene-linear $C_{4\ to\ 10}$ olefin copolymers having a fluidity index (MFI) measured according to the ISO 1133 standard between 3 and 10 g/10 min inclusive, and preferably between 3.5 and 9 g/10 min inclusive, and a density between 0.880 and 0.935 g/cm$^3$ inclusive, and preferably between 0.900 and 0.930 g/cm$^3$ inclusive, by the fact that the skirt has a wall thickness at mid-height between 0.30 and 1.00 mm inclusive, and preferably between 0.35 and 0.95 mm inclusive, for a length between 40 and 200 mm inclusive, and by the fact that the head and the skirt are manufactured in a single operation of injection in a mold, in order to obtain a flexible tube which is resistant to stress cracking and impermeable to water vapor.

In a preferred embodiment of the invention, the mixture of ethylene-linear $C_{4\ to\ 10}$ olefin copolymers is either a mixture of ethylene-linear $C_{4\ to\ 5}$ olefin copolymers or a mixture of ethylene-linear $C_{6\ to\ 10}$ olefin copolymers.

According to a particularly preferred embodiment, the ethylene-linear $C_{4\ to\ 10}$ olefin copolymer(s) is(are) ethylene-octene copolymer(s).

Preferably, the injection mold for the tube has mold cavity 5 and mold insert 4 which has central part 8 whose free upper end 9 has feed channels 10 and is supported centered on cavity 5 during the phase of injection of the tube.

In a preferred embodiment, said end 9 is in the shape of a reentrant cone, and the angles a between channels 10 and the vertical axis of cavity 5 are less than 90°.

In an advantageous embodiment, the total widths of channels 10 at their zones of connection A with the end piece of the head of the tube represent at least 15%, and preferably more than 25% of the perimeter of this end piece.

Even more advantageously, channels 10 have a width which increases from injection point 13 according to a centrifugal radial direction to their points of connection A with the end piece of the head of the tube.

Most advantageously, the end piece of the distribution head has an annular zone of narrowing beyond the zone of connection A of channels 10 with the end piece of the head of the tube.

In the case in which one does not wish to connect an end piece on the tube but rather to simply produce a tube in a single piece, end piece included, central part 8 of the insert of the injection mold is mobile, and upper wall 6 of the end piece of the head of the tube is injected after movement of the mobile part back a determined distance as a function of the thickness of the wall which is desired.

With regard to the materials, one will choose a fluidity index of the ethylene-linear $C_{4\ to\ 10}$ olefin copolymer or mixture of these copolymers between 5 and 10 g/10 min inclusive, and preferably between 5 and 9 g/10 min inclusive, and a thickness of the wall at mid-height of the skirt situated on the curve represented in FIG. 2, as a function of the length of the skirt + or −0.05 mm, in order to obtain a tube with improved flexibility.

One will select the fluidity index of the ethylene-linear $C_{4\ to\ 10}$ olefin copolymer or mixture of these copolymers to be between 3 and 6.5 g/10 min inclusive, and preferably between 3.5 and 6.5 g/10 min inclusive, and a thickness of the wall at mid-height of the skirt on the curve represented in FIG. 3, as a function of the length of the skirt + or −0.5 mm, in order to obtain a tube with improved resistance to stress cracking, particularly in the presence of surfactant products.

In these cases, preferably, the density of the ethylene-linear $C_{4\ to\ 10}$ olefin copolymer or mixture of these copolymers is between 0.880 and 0.920 g/cm³ inclusive, and preferably between 0.900 and 0.920 g/cm³ inclusive, in order to obtain a tube with improved flexibility.

This is more particularly appropriate when the skirt has a length greater than or equal to 75 mm.

Even more preferably, the fluidity index of the ethylene-linear $C_{4\ to\ 10}$ olefin copolymer or mixture of these copolymers is between 5 and 10 g/10 min, and preferably between 5 and 9 g/10 min inclusive, and the density of the ethylene-linear $C_{4\ to\ 10}$ olefin copolymer or mixture of these copolymers is between 0.900 and 0.920 g/cm³ inclusive.

Most advantageously, the wall of the tube is made of an ethylene-octene copolymer with a fluidity index between 5 and 6 g/10 min inclusive and a density equal to 0.919 g/cm³.

According to another embodiment, the density of the ethylene-linear $C_{4\ to\ 10}$ olefin copolymer or mixture of these copolymers is between 0.925 and 0.935 g/cm³ inclusive for a thickness of the wall at mid-height of the skirt close to 0.45 mm, between 0.920 and 0.930 g/cm³ for a thickness of the wall at mid-height of the skirt close to 0.60 mm, between 0.915 and 0.925 g/cm³ for a thickness of the wall at mid-height of the skirt close to 0.75 mm, in order to obtain a tube with reinforced impermeability to water vapor.

Preferable in this case is a wall made of a mixture of: a) 33 to 67 wt %, with respect to the total weight of the mixture, of an ethylene-linear $C_{4\ to\ 10}$ olefin copolymer having a density between 0.900 and 0.920 g/cm³ inclusive, and [b] 67 to 33 wt %, with respect to the total weight of the mixture, of an ethylene-linear $C_{4\ to\ 10}$ olefin copolymer having a density between 0.920 and 0.935 g/cm³ inclusive, in order to obtain a tube with reinforced impermeability to water vapor and with optimized flexibility as a function of the thickness of the wall at mid-height of the skirt.

Preferably, the wall is a mixture of: a) 33 to 67 wt %, with respect to the total weight of the mixture, of an ethylene-octene copolymer having a fluidity index between 3 and 6.5 g/10 min inclusive and a density between 0.900 and 0.920 g/cm³ inclusive, and b) 67 to 33 wt %, with respect to the total weight of the mixture, of an ethylene-octene copolymer having a fluidity index between 3 and 6.5 g/10 min and a density between 0.920 and 0.935 g/cm³ inclusive, in order to obtain a tube with reinforced impermeability to water vapor and optimized flexibility as a function of the thickness of the wall at mid-height and of the length, of the skirt.

More preferably, the wall is a mixture of: a) 33 to 67 wt %, with respect to the total weight of the mixture, of an ethylene-octene copolymer having a fluidity index between 5 and 6 and a density equal to 0.919 g/cm³, and b) 67 to 33 wt %, with respect to the total weight of the mixture, of an ethylene-octene copolymer having a fluidity index between 3 and 4 g/10 min and a density equal to 0.935 g/cm³.

Most preferably, each ethylene-octene copolymer represents 50 wt % of said mixture.

In yet another embodiment, the tube has a wall made of a mixture of: a) 33 to 67 wt %, with respect to the total weight of the mixture, of an ethylene-octene copolymer having a fluidity index between 3 and 5 g/10 min and a density equal to 0.915 g/cm³, and b) 67 to 33 wt %, with respect to the total weight of the mixture, of an ethylene-octene copolymer having a fluidity index between 3 and 4 g/10 min and a density equal to 0.935 g/cm³, in order to optimize the resistance to stress cracking and impermeability to water at the expense of less flexibility of the wall of the tube.

The invention will be better understood and other aims and advantages of it will appear more clearly upon reading of the following explanatory description given in reference to the appended figures in which:

FIG. 1 diagrammatically represents the zones of selection of the fluidity indexes and densities of the ethylene-linear $C_{4\ to\ 10}$ olefin copolymer or mixture of these copolymers according to the particular properties which are desired for the tube which is obtained.

FIG. 2 represents, in the form of a curve, the thicknesses of the wall of the skirt at mid-height of the skirt which are to be chosen as a function of the desired length of the skirt, when the wall of the tube is made of an ethylene-linear $C_{4\ to\ 10}$ olefin copolymer or mixture of these copolymers having [a fluidity index] between 5 and 10 g/10 min inclusive, and preferably between 5 and 9 g/10 min inclusive, in order to obtain a tube with improved flexibility.

FIG. 3 represents, in the form of a curve, the thicknesses of the wall of the skirt at mid-height of the skirt which are to be chosen as a function of the desired length of the skirt, when the wall of the tube is made of an ethylene-linear $C_{4\ to\ 10}$ olefin copolymer or mixture of these copolymers having [a fluidity index] between 3 and 6.5 g/10 min inclusive, and preferably between 3.5 and 6.5 g/10 min inclusive, in order to obtain a tube with improved resistance to stress cracking, in particular in the presence of surfactant products.

FIG. 4 represents a mold of prior art which can be used for the injection of the tube according to the invention.

FIG. 5 represents a mold of prior art which is preferably used for the injection of the tube of the invention.

FIG. 6 diagrammatically represents the flow sheets during injection of the tube of the invention with the mold represented in FIG. 5.

FIG. 7 is an enlarged view of the part noted VII in FIG. 5.

Figure 8:
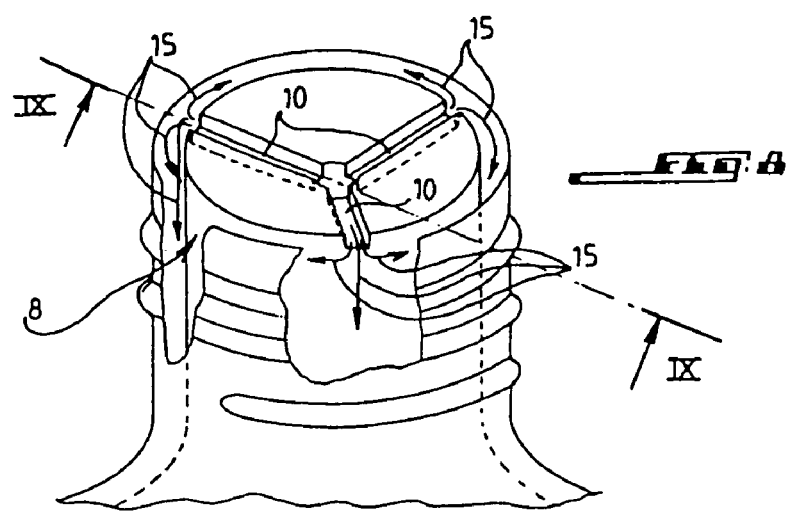

FIG. 8 diagrammatically represents a perspective view of the head of the mold which is to be used most preferably for injection of the tube of the invention.

Figure 9:
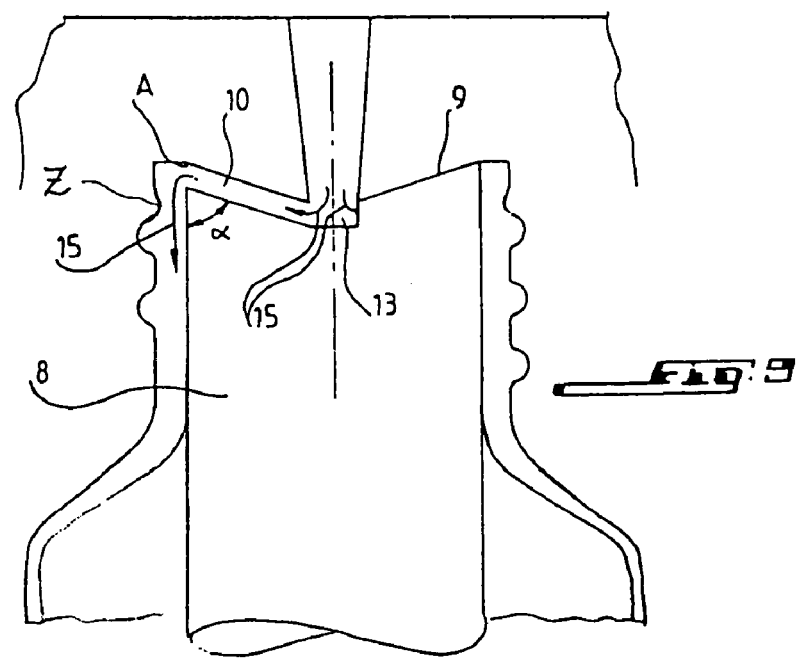

FIG. 9 is a view in section according to axis IX-IX of FIG. 8.

Figure 10:
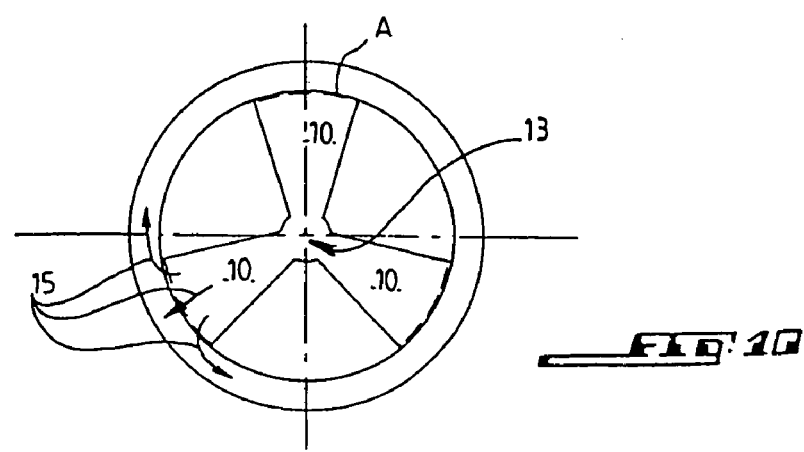

FIG. 10 is a top view of upper part 9 of the mobile part of the mold represented in FIG. 7.

In a general manner, the tubes consist of a skirt, of constant cross section, of circular, oval or other shape, closed at one of its ends by heat fusing, after filling of the tube with the pasty product which is to be packaged. At the other end, the tube is configured in such a way as to form a distribution head for the product contained in the skirt.

The capacity of the tube is its primary characteristic. In the particular case of a tube with constant circular cross section, the capacity is defined by the length and the diameter of the skirt, that is to say by the length and the diameter of the circular cross section of the skirt.

The capacities ordinarily offered on the market are between 2 and 500 mL. The ratios of the skirt lengths with respect to the diameter of the skirts ordinarily observed on the market are between 2.5 and 6, and preferably 4.

The invention preferably applies to the formats in effect on the market and therefore complies with a ratio of skirt length with respect to the diameter between 2.5 and 6, and preferably 4.

Depending on the capacity of the tube, and depending on the skirt length/diameter ratio of the tube, the length of the skirt is therefore between 40 and 200 mm.

The skirt of the tube must at the same time be resistant to stress cracking, impermeable to water vapor, and flexible.

Stress cracking or "stress cracking" is a phenomenon of physicochemical attack of a surfactant product on a polymer. This phenomenon is expressed by the formation of microcracks in the polymer, which can go as far as bursting the wall. The risk of bursting is particularly great in the vicinity of the heat fused end.

The products contained in the tube are loaded to varying degrees with surfactants and can therefore cause cracking or bursting of the envelope.

In order to characterize the resistance of the material to stress cracking, the tubes obtained are tested in the following way:

The tube is filled with a surfactant solution with a concentration of 0.3%, for example, of Igepal CO 630 or ethoxylated nonylphenol in distilled water, and is fused at the end by hot squeezing. The tube is placed in an oven at 55° C. for 24 hours. Coming out of the oven, a pressure of 2 to 4.5 bars is applied for 2 to 10 seconds, according to the specifications of the orderer. Coming out of the oven, the tube must not have any leak at the fused part or any crack or tear of the wall.

The products contained in the flexible envelope are also loaded to varying degrees with water.

Currently, in particular in cosmetology, the packaged products are evolving towards aqueous base emulsions. The packaging of these products must therefore meet increasingly severe criteria of impermeability to water vapor in order to prevent an excessive loss of weight by evaporation of the water through the flexible wall, and consequently a modification of the "pasty" character of the cream packaged in the tube. Furthermore, the measurement of the permeability to water is always done in percentage of the loss of weight of the cream by evaporation, with respect to the initial weight of cream contained in the tube. The weight loss ratio therefore depends simultaneously on the porosity with regard to water and on the ratio between the surface area of evaporation, that is to say the surface area of the skirt, and the volume of cream contained in the tube.

The test of impermeability to water consists of placing the tubes, which are filled beforehand with the product which to be tested and are fused, in an oven whose temperature, depending on the tests, is between 45 and 55° C., for a period of time, depending on the tests, between 2 and 8 weeks.

Depending on the nature of the cream, the size of the tube, the volume of cream contained in the tube and the barrier effect requirement of the specifications, the loss of weight must be less than 2%, 3%, 5% or 8% in the least restrictive case.

As an example, a loss of weight of 30% [sic; 3%] for a quantity of cream of 5 grams in a tube with diameter 19 [sic] represents an evaporation of 0.15 grams of water. This is therefore an extremely restrictive test in the case of an exposure of the tube in an oven at 45° C. for 8 weeks.

In a general manner, the difficulty of the test increases with reduction of the size of the tube: as the capacity of the tube decreases, the ratio of evaporation surface area constituted by the skirt with respect to the volume of cream contained in the tube increases.

For the same reason, the difficulty of the test increases when the tube is only partially filled, which [condition] also contributes towards increasing the ratio of evaporation surface area with respect to the volume of cream.

In summary, the evaporation being proportional to the surface area of the skirt, the loss of weight is proportionally greater for tubes of small capacity, moreover which are partially filled.

Finally, the skirt of the tube must be flexible in order to allow evacuation of the pasty products contained in it, simply by the user putting pressure on the wall.

The flexibility of the wall is inversely proportional to its thickness and to the density of the thermoplastic material.

In the traditional extrusion process, the material is extruded through the die in stabilized thermodynamic flow, the tubular skirt being definitively formed coming out of the die and advancing in rhythm with its formation coming out of the die. This technology therefore allows one to work extremely viscous materials, with an MFI less than 1 or close to 1 g/10 min, which are very resistant to stress cracking, in small wall thicknesses, for example, between 0.30 and 0.50 mm, which correlatively allows one to use materials of high density, for example, close to 0.950 g/cm$^3$, which are great barriers to water vapor, while keeping an acceptable wall flexibility because of their small thickness.

In contrast, in the process of injection, the thickness of the wall is a function of the length of the skirt. In effect, the material, coming out of the point of injection of the material, must travel the route inside of the mold ensuring the filling of the mold. During this phase of travel inside the cooled mold, the material changes state (rheology in the melted state) and can be degraded by exceeding its limit shearing speed or its limit temperature, if the material is too viscous, if the wall is too thin, or if the length of running in the mold (length of the skirt) is too long.

In order to obtain a resistance to stress cracking according to the specifications of compatibility, it is necessary to use viscous materials (low fluidity index) and therefore to increase the thickness of the wall in order to make the material injectable, which contributes to stiffening this wall.

Furthermore, the density of the copolymer has no significant influence on the injectability but has a determining influence on the flexibility of the wall. As an example, two ethylene-octene copolymers of the same grade (for example, 6) form a stiff wall for a density of 0.950 g/cm$^3$ and a very flexible wall for a density of 0.900 g/cm$^3$, if this wall has a thickness of 0.6 mm.

One therefore sees that there is a contradiction between the process of injection which requires either the working of fluid materials having an MFI equal to 10 g/10 min or more, which are non-resistant or weakly resistant to stress cracking, or the use of thick walls, thickness which induces unacceptable stiffness of the tube if one uses a sufficiently dense material to ensure the impermeability to water of the tube.

Currently, there is no known material and process allowing injection of this material in order to form a tube, except with irremediable degradation of this material by exceeding its limit shearing speed and/or by exceeding its limit temperature during the injection, if one requires that the wall of the tube be simultaneously flexible, resistant to stress cracking and impermeable to water for a skirt length between 40 and 200 mm.

The invention therefore consists of obtaining, by the process of injection, a thin wall for wall lengths of 40 to 200 mm and of formulating a material which simultaneously has good characteristics of flexibility, resistance to stress cracking and impermeability to water, the wall thickness increasing correlatively with the length of the skirt, the wall being sufficiently thick for allowing injection of very viscous materials guaranteeing resistance to stress cracking, the density of the formulated materials guaranteeing impermeability to water vapor of the wall, the wall keeping an acceptable flexibility taking into account its thickness and the density of the formulated material, the material being injected without irremediable degradation by exceeding the limit shearing speed or exceeding the limit temperature during the injection.

Figure 1:
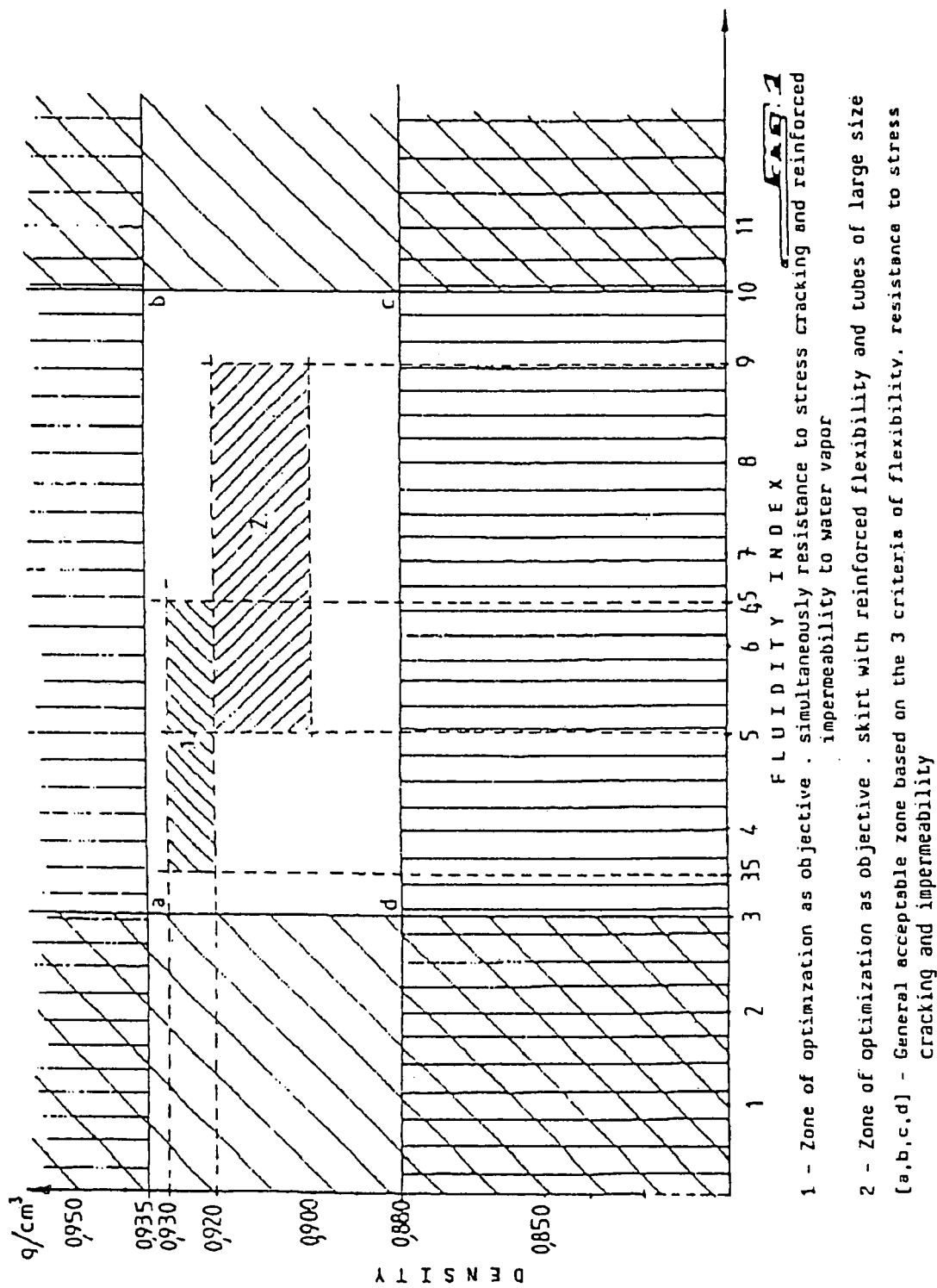

Contrary to the presumptions of prior art, it has been found that an ethylene-linear $C_4$ to $C_{10}$ olefin copolymer or a mixture of ethylene-linear $C_4$ to $C_{10}$ olefin copolymers having a fluidity index (MFI) measured according to the ISO 1133 standard between 3 and 10 g/10 min, and preferably between 3.5 and 9 g/10 min, and a density between 0.880 and 0.935 g/cm$^3$, that is to say when the copolymer or mixture of these copolymers has a fluidity index and a density included in the white zone noted [a,b,c,d] in FIG. 1, [it] can be injected without destruction by exceeding the limit shearing speed and/or exceeding the limit temperature, in order to form a tube whose skirt has a wall thickness between 0.30 and 1.0 mm, and preferably between 0.35 and 0.95 mm, with a skirt length between 40 and 200 mm.

In effect, and as illustrated in FIG. 1, when the MFI of the ethylene-linear $C_{4\ to\ 10}$ olefin copolymer or mixture of these copolymers is less than 3, the material is no longer injectable because of exceeding the limit shearing speed in the flow path (length/thickness ratio) of the skirt required in order to keep the flexibility of the tube. In the same way, when the MFI of the ethylene-linear $C_{4\ to\ 10}$ olefin copolymer or mixture of these copolymers is greater than 10, the tube obtained does not have acceptable resistance to stress cracking.

Likewise, when the ethylene-linear $C_4$ to $C_{10}$ olefin copolymer or mixture of these copolymers has a density less than 0.880 g/cm$^3$, the tube which is obtained has an excessive permeability to water vapor. And if the ethylene-linear $C_4$ to $C_{10}$ olefin copolymer or mixture of these copolymers has a density greater than 0.935 g/cm$^3$, the stiffness of the tube which is obtained becomes excessive, for a thickness of weight [sic] between 0.30 and 1.00 mm, and preferably between 0.35 and 0.95 mm required for making the material injectable.

In other words, in order to obtain a tube which can be manufactured by the process of injection, in a single injection operation and having a permeability to water vapor and a resistance to stress cracking in accordance with the specifications defined in the preceding, a flexibility allowing evacuation of the product by simple pressure of the user and an ability to be fused by the so-called "hot air" or "heating grippers" methods currently used, the tube must consist of an ethylene-linear $C_4$ to $C_{10}$ olefin copolymer or a mixture of ethylene-linear $C_4$ to $C_{10}$ olefin copolymers having a fluidity index between 3 and 10 g/10 min inclusive and a density between 0.880 and 0.935 g/cm$^3$. Preferably, the ethylene-linear $C_4$ to $C_{10}$ olefin copolymer or the mixture of ethylene-linear $C_4$ to $C_{10}$ olefin copolymers has a fluidity index between 3.5 and 9 g/10 min inclusive and a density between 0.900 and 0.930 inclusive.

When a mixture of these copolymers is used, it is preferable to use either a mixture of ethylene-linear $C_4$ to $C_5$ olefin copolymers, or a mixture of ethylene-linear $C_6$ to $C_{10}$ olefin copolymers. In effect, one thus avoids mixtures which are heterogeneous from the standpoint of molecular structure which can give rise to injected tubes which are not homogeneous from the standpoint of chemical composition and therefore are not in accordance with the desired characteristics of the mixture.

In this regard, one will preferably choose mixtures of ethylene-linear olefin copolymers having the same number of carbons in the olefin, when the material is composed of a mixture of two copolymers.

Most preferably, for a defined fluidity index, one will choose a copolymer or mixture of these copolymers whose molecule has a high number of carbons, which contributes towards improving the resistance to stress cracking.

Moreover, by selecting the fluidity index of the material, its density and also the thickness of the wall, it is possible to manufacture tubes with particular properties such as higher flexibility, particularly high impermeability to water vapor, improved resistance to stress cracking, as a function of the nature of the cream, the size of the tube, its filling level and the specifications of compatibility.

Of course, the thickness of the wall has to be modulated as a function of the length of the skirt because the tube is to be manufactured by the process of injection, in a single operation.

The thickness of the wall referred to here is the average thickness of the wall along the length of the skirt of this wall. By convention, this average thickness is measured at mid-height of the skirt of the tube which is obtained.

Thus, for the purpose of optimizing the flexibility of the wall, by reducing its thickness, one formulates an ethylene-linear $C_4$ to $C_{10}$ olefin copolymer or a mixture of ethylene-linear $C_4$ to $C_{10}$ olefin copolymers having a fluidity index between 5 and 10 g/10 min inclusive, and preferably between 5 and 9 g/10 min inclusive.

Figure 2:
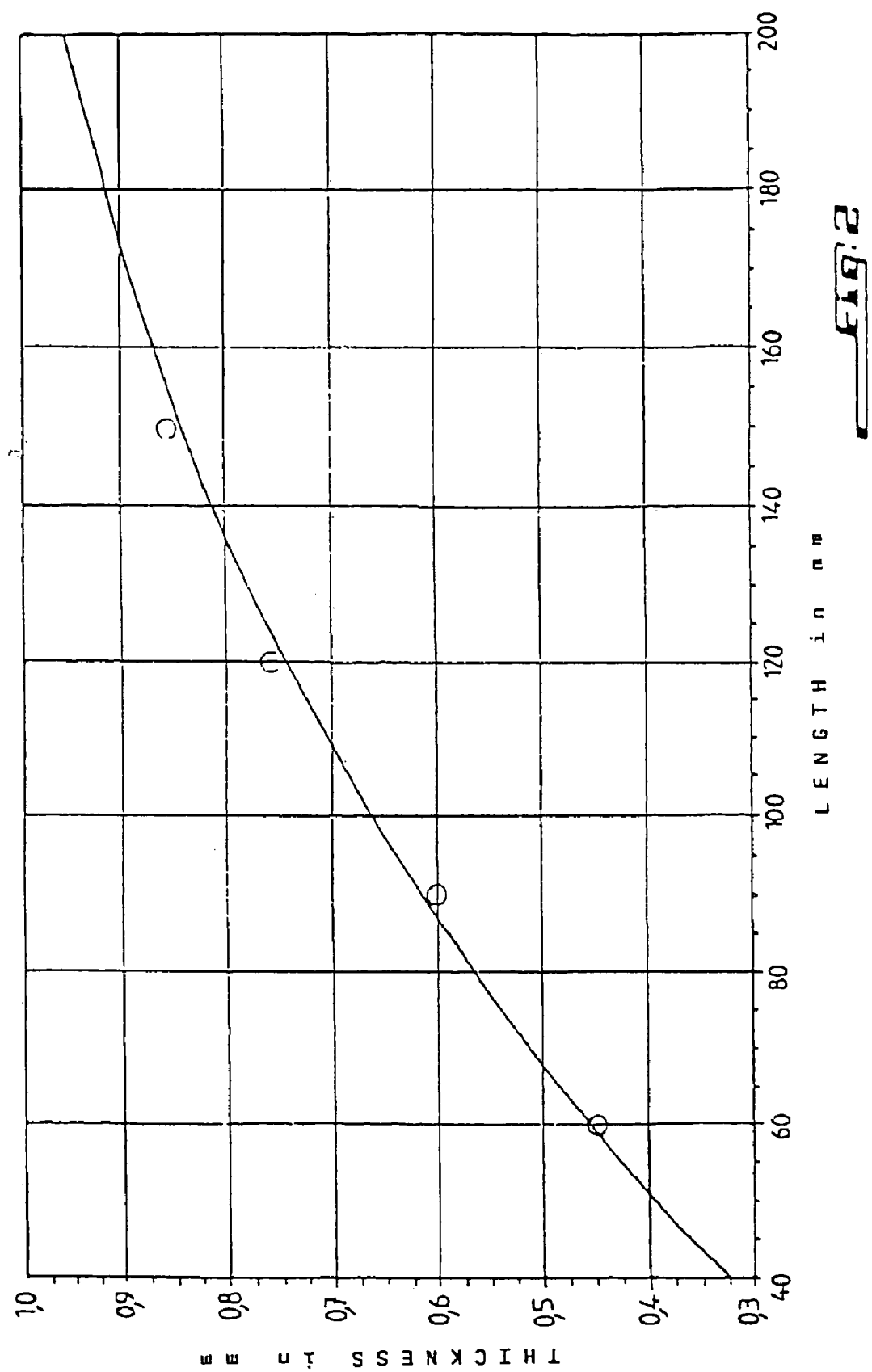

The minimum thickness of the wall being determined by the length of the skirt of the tube and the fluidity index of the material which is used, it has been found that with the ethylene-linear $C_4$ to $C_{10}$ olefin copolymer or mixture of these copolymers having a fluidity index between 5 and 10 g/10 min inclusive, and preferably between 5 and 9 g/10 min inclusive, that is to say having a relatively high fluidity index, the average thickness of the wall of the skirt must be chosen on the curve represented in FIG. 2, as a function of the desired skirt length. Thus, the average thickness of the skirt tends towards a lower limit in the vicinity of:

0.45 mm for a skirt length close to 60 mm;
0.60 mm for a skirt length close to 90 mm;
0.75 mm for a skirt length close to 120 mm;
0.85 mm for a skirt length close to 150 mm; and
0.95 mm for a skirt length close to 200 mm.

This choice is particularly pertinent for large tubes or for materials of high density, because it allows one to minimize the stiffness imposed, either by the thickness induced by the flow length, or by the density of the material.

On the other hand, in the case in which one wishes to package creams containing highly surface active agents or in the case of tubes of low capacity inducing high weight loss ratios, one will preferably formulate an ethylene-linear $C_4$ to $C_{10}$ olefin copolymer or mixture of these copolymers having a fluidity index between 3 and 6.5 g/10 min inclusive, and preferably between 3.5 and 6.5 g/10 min inclusive, which obliges one to increase the thickness of the wall. In this case, the average thickness of the wall of the skirt must be chosen on the curve represented in FIG. 3, as a function of the desired skirt length, in order optimize the flexibility of the tube. Thus, the average thickness of the skirt will tend towards a lower limit in the vicinity of:

0.55 mm for a skirt length close to 60 mm;
0.70 mm for a skirt length close to 90 mm;
0.83 mm for a skirt length close to 120 mm;
0.90 mm for a skirt length close to 150 mm; and
1.00 mm for a skirt length close to 200 mm.

Figure 3:
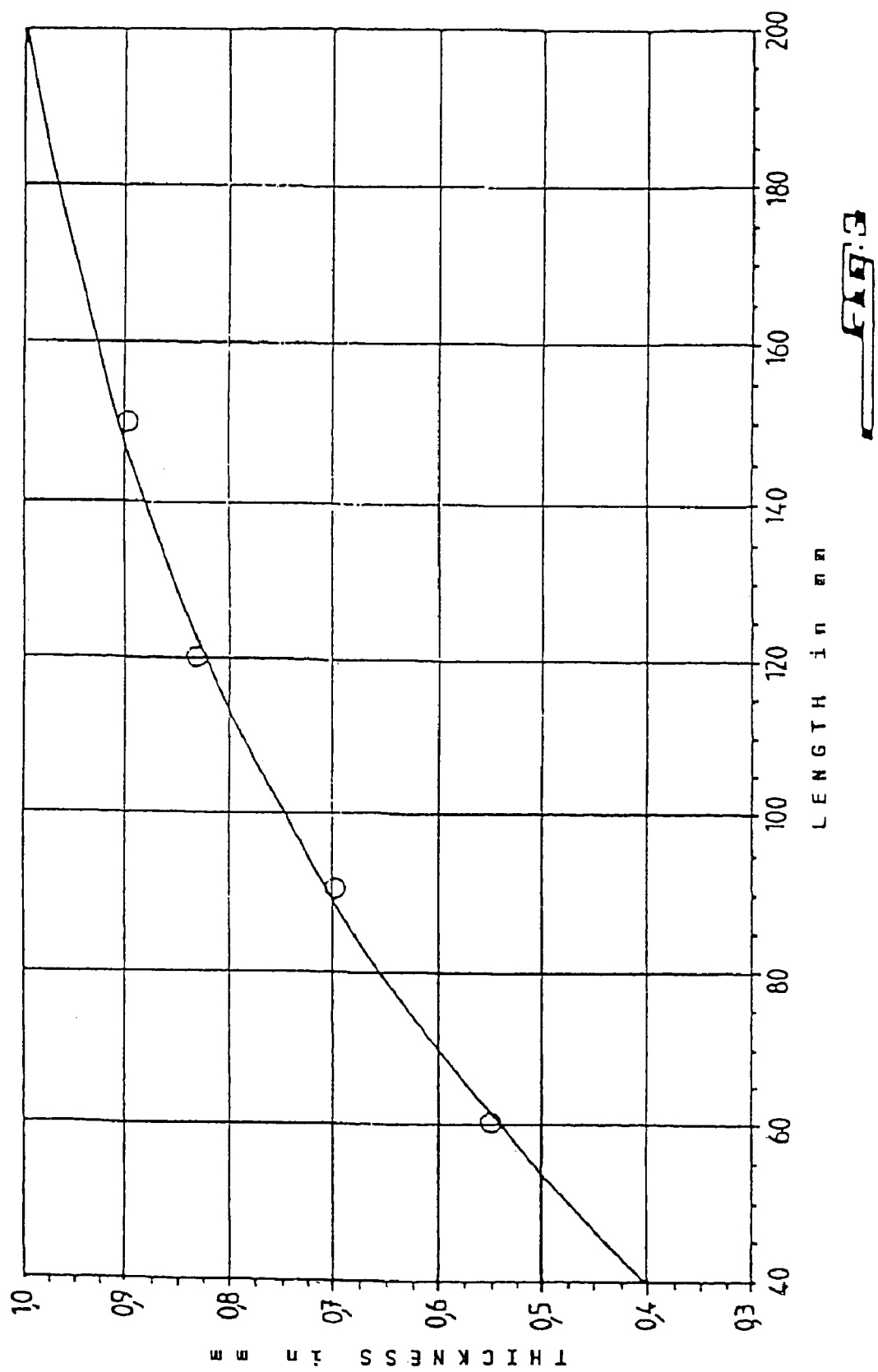

The wall thickness values at mid-height of the skirt are given at ±0.05 mm in FIGS. 2 and 3 as well as in the preceding.

For the purpose of having very flexible tubes, when the impermeability constraints are low or when the ratio of evaporation surface area with respect to the volume is favorable, for example, for tubes whose skirt length is greater than or equal to 75 mm, one will formulate an ethylene-linear $C_{4\ to\ 10}$ olefin copolymer or mixture of these copolymers whose density will be between 0.880 and 0.920 g/cm$^3$, and preferably between 0.900 and 0.920 g/cm$^3$ inclusive.

The tube will be even more flexible if it is injected out of an ethylene-linear $C_{4\ to\ 10}$ olefin copolymer or mixture of these copolymers whose MFI is between 5 and 10 g/10 min inclusive, and preferably between 5 and 9 g/10 min inclusive, and whose density is between 0.900 and 0.920 g/cm$^3$ inclusive, which allows one to choose the minimum wall thickness for a given skirt length.

A particularly preferred practical example of this solution is an ethylene-octene copolymer with a fluidity index between 5 and 6 inclusive and a density equal to 0.919 g/cm$^3$, for example, Dowlex 2035E.

Inversely, when one wishes to optimize the property of impermeability to water of the tube which is produced, while keeping an acceptable flexibility, one will choose an ethylene-linear $C_4$ to $C_{10}$ olefin copolymer or mixture of these copolymers having a density between 0.925 and 0.935 g/cm$^3$ inclusive for an average wall thickness of the skirt close to 0.45 mm, between 0.920 and 0.930 g/cm$^3$ inclusive for an average wall thickness of the skirt close to 0.60 mm, or between 0.915 and 0.925 g/cm$^3$ inclusive for an average wall thickness of the skirt of 0.75 mm.

It is suitable in effect to reduce the density of the material used when one increase the thickness of the wall, if one wishes to keep a constant flexibility of the wall regardless of its thickness.

The wall thickness correlating with its length, the increased permeability of a wall of great length produced in a material of lower density is compensated for by the improvement of the ratio of evaporation surface area with respect to the volume of contained cream resulting from the increase of the size of the tube, and by the thickening of the wall.

By this means, one therefore obtains a constant and optimized wall flexibility, the ratio of weight loss of the cream contained in the tube being also stabilized, regardless of the size of the tube.

The application of the invention is particularly pertinent for tubes which are great barriers to water and therefore with reduced flexibility.

It is possible not to obtain the characteristics of fluidity index and density which are looked for by using an ethylene-linear $C_4$ to $C_{10}$ olefin copolymer alone. In this case, one will use a mixture of ethylene-linear $C_4$ to $C_{10}$ olefin copolymers allowing one to obtain the optimal fluidity indexes and densities as a function of the desired characteristics and the size of the tube.

For example, in order to obtain a tube with reinforced impermeability to water vapor and with optimized flexibility as a function of the length and of the thickness average of the wall of the skirt, one will use a mixture of 33 to 67 wt %, with respect to the total weight of the mixture, of an ethylene-linear $C_4$ to $C_{10}$ olefin copolymer with a density between 0.900 and 0.920 g/cm$^3$ inclusive and 67 to 33 wt %, with respect to the total weight of the mixture, of an ethylene-linear $C_4$ to $C_{10}$ olefin copolymer with a density between 0.920 and 0.935 g/cm$^3$ inclusive. Modulation of the composition of the mixture permits one to modulate the density and therefore to stabilize the flexibility of the wall as a function of its thickness, that is to say indirectly of the length of the skirt, the increased porosity being compensated for by the improvement of the ratio of the evaporation surface area with respect to the weight of contained cream, as disclosed in the preceding.

More precisely, in order to obtain a tube having at the same time a very good resistance to stress cracking and a very good barrier effect to water vapor, the flexibility being optimized as a function of the length and of the average thickness of the wall of the skirt, one will preferably use a mixture of 33 to 67 wt %, with respect to the total weight of the mixture, of an ethylene-octene copolymer with a fluidity index between 3 and 6.5 g/10 min inclusive and a density between 0.900 and 0.920 g/cm$^3$ inclusive and 67 to 33 wt %, with respect to the total weight of the mixture, of an ethylene-octene copolymer with a fluidity index between 3 and 6.5 g/10 min and a density between 0.920 and 0.935 g/cm$^3$ inclusive, the modulation of the composition of the mixture allowing one in the same way to stabilize the flexibility as a function of the wall.

As an example, the desired effect will be reached by using a mixture of 33 to 67 wt %, with respect to the total weight, of Dowlex 2035E with a fluidity index between 5 and 6 g/10 min and a density equal to 0.919 g/cm$^3$ and 67 to 33 wt %, with respect to the total weight, of Dowlex NG 2429, with a fluidity index between 3 and 4 g/10 min and a density equal to 0.935 g/cm$^3$.

More precisely, a mixture of 50 wt % of the first copolymer and 50 wt % of the second copolymer is more preferred because this mixture guarantees control of the amount measured in each injection and an optimized balance between weight loss and flexibility for tubes of small size. Thus, a preferred mixture according to the invention for obtaining a tube with a good resistance to stress cracking and a very good impermeability to water vapor with an acceptable flexibility will contain a mixture containing 50 wt % of each of the ethylene-actene [sic; octene] copolymers mentioned above.

In order to ensure the packaging of very highly surface active products, the fluidity index of the material is reduced into a limit greater than or equal to 3 and preferably 3.5. It is then preferable to use materials consisting of a mixture of 33 to 67 wt %, with respect to the total weight of the mixture, of an ethylene-linear $C_4$ to $C_{10}$ olefin copolymer with a fluidity index between 3 and 4 g/10 min and a density equal to 0.935 g/cm$^3$ and 67 to 33 wt %, with respect to the total weight of the mixture, of an ethylene-linear $C_4$ to $C_{10}$ olefin copolymer with a fluidity index between 5 and 6 g/10 min and a density equal to 0.915 g/cm$^3$. In this case also, preferably, one will use ethylene-octene copolymers. As a counterpart to the effect obtained, the flexibility of the wall is attenuated proportionally to the increase of its thickness.

Table 1 hereafter presents examples of implementation of the invention. These examples are intended to illustrate the invention and not to limit it. In particular, in these examples, all the copolymers are ethylene-octene copolymers or ethylene butene or ethylene hexene copolymers. However, tests have been done with ethylene-linear $C_4$ to $C_{10}$ olefin copolymers giving similar results, the properties of flexibility, resistance to stress cracking and barrier to water vapor being modulated in the same manner as a function of the fluidity index and the density of the material as well as the thickness of the wall.

The characteristics and proportions of the copolymers used are given in Table 1 hereafter and also in FIG. 1.

| | Characteristics of the copolymer which was used | | | | | | Characteristics of the tube obtained | |
|---|---|---|---|---|---|---|---|---|
| Example No. | Copolymer which was used | Number of C of the olegin (type) | wt % | Density | MFI g/10 mn | Density of mixture g/cm$^3$ | Result obtained | Use |
| M1 | Dowlex NG 2429 | 8 | 100 | 0.935 | 3 to 4 | 0.935 | very good resistance to stress cracking very good impermeability to water stiffness at the limit of acceptability | tubes with barrier effect and improved impermeability preferably tubes of small size comfort of use mediocre |
| M2 | Dowlex NG 2429 | 8 | 67 | 0.935 | 3 to 4 | 0.930 | very good resistance to stress cracking good impermeability to water mediocre flexibility | tubes with improved barrier effect, improved impermeability preferably tubes of small size |
| | Dowlex 2035E | 8 | 33 | 0.919 | 5 to 6 | | | |
| M3 | Dowlex NG 2429 | 8 | 50 | 0.935 | 3 to 4 | 0.927 | good resistance to stress cracking good impermeability to water moderate flexibility | tubes with improved barrier effect, improved impermeability and good comfort of use preferably tubes of small size |
| | Dowlex 2035E | 8 | 50 | 0.919 | 5 to 6 | | | |
| M4 | Dowlex NG 2429 | 8 | 33 | 0.935 | 3 to 4 | 0.924 | good resistance to stress cracking good impermeability to water good flexibility | tubes with improved barrier effect and moderate impermeability improved comfort of use preferably tubes of moderate length |
| | Dowlex 2035E | 8 | 67 | 0.919 | 5 to 6 | | | |
| M5 | Dowlex NG 2429 | 8 | 50 | 0.935 | 3 to 4 | 9.925 | good resistance to stress cracking good impermeability to water good flexibility | tubes with improved barrier effect and moderate impermeability improved comfort of use preferably tubes of moderate length |
| | Stamilex 0.9-0.46 | 8 | 50 | 0.915 | 3.5-4.5 | | | |
| M6 | Dowlex 2035$^E$ | 8 | 100 | 0.919 | 5 to 6 | 0.919 | good resistance to stress cracking moderable impermeability to water very good flexibility | tubes with improved flexibility applicable to all sizes including tubes of great length |
| M7 | Exact 2M077 | 8 | 33 | 0.902 | 9 to 10 | 0.913 | moderate resistance to stress cracking moderate impermeability to water very great flexibility | for great comfort of use tubes of large capacity tubes for packaging weakly surface active creams with limited weight loss or limited duration of use tubes of large capacity |
| | Dowlex 2035E | 8 | 67 | 0.919 | 5 to 6 | | | |
| M8 | Luflexen 18T-FA | 4 | 100 | 0.918 | 3 to 4 | 0.918 | good resistance to stress cracking moderate impermeability to water very good flexibility | tubes with improved flexibility applicable to all sizes including tubes of great length |
| M9 | BP LL6130 | 6 | 100 | 0.918 | 3 to 4 | 0.918 | good resistance to stress cracking moderate impermeability to water very good flexibility | tubes with improved flexibility applicable to all sizes including tubes of great length |

Thus as seen in the preceding, a material has now been found which allows one to manufacture tubes with flexibility, impermeability to water vapor, resistance to stress cracking, which are completely suitable with variation of different parameters such as the fluidity index of the material which is used and its density, the thickness of the wall which must moreover vary depending on the length of the tube. The materials which are used in extrusion cannot be injected because of a fluidity index which is too low, for the skirt lengths imposed by the volume of the tube and in the wall thicknesses used in this process for simultaneously obtaining the required flexibility of the wall and impermeability to water vapor.

On the other hand, the materials of the invention can be injected, the head and the skirt being injected in a single operation, using extreme conditions of injection pressure allowing one to inject materials with high viscosity into thin walls. The usual injection pressures are on the order of 450 to 600 bars. For materials used in the invention with high viscosity, the injection pressures which are used are on the order of 1250 to 2500 bars depending on the length of the skirt, the thickness of the skirt and the viscosity of the injected material.

In prior art, the tube is injected into a mold as represented in FIG. 4 and composed of an insert noted 4 in FIG. 4, a cavity insert 5 in FIG. 4, and a nozzle receiver 6 in FIG. 4 in which injection nozzle 7 in FIG. 4 fits, that is to say the channel through which the melted plastic material is led into the cavity insert defined by the nozzle receiver, the cavity insert and the insert. Under the effect of the very high injection pressure necessary for injecting the material in the wall thicknesses required for the flexibility of the tube, the insert has a tendency to bow towards the cavity insert. This results in a variable wall thickness and therefore in variable flexibility. Much more seriously, the decentering of the insert generates preferential streams of material during injection of the skirt, preferential streams which join together in "weld lines", these "weld lines" forming zones of lack of resistance to stress cracking.

It is therefore very important for the wall of the tube to be of constant thickness, without reinforcement of any material, including longitudinal, in order to keep both the comfort of use and the resistance to stress cracking.

A first injection mold for obtaining this result is that of the type represented in FIG. 5. As seen in FIG. 5, this mold has central part 8. Central part 8 of insert 4 has free end 9 in FIG. 5 which rests centered on nozzle receiver 6.

In order to proceed with the injection of the material from central injection point 13 to the head of the tube, radial feed channels are created in free end 9 of central core 8. The feed channels 10 can be seen more clearly in FIG. 7, which is an enlarged view of the part noted VII in FIG. 5.

However, the use of this technique has the disadvantage of creating as many feed points of the skirt as the number of feed channels between the injection point and the head of the tube. In effect, as represented in FIG. 6, from the three channels 10, three independent feed streams of the skirt are created, which generate the creation of three independent sheets of material 11 in FIG. 6 of the skirt, which are connected by weld lines 12 in FIG. 6.

These weld lines have the serious disadvantage of creating zones of lack of resistance to stress cracking of the skirt. Moreover, these weld lines can possibly cause the appearance of facets on the skirt which modify the original shape of the tube, degrade its appearance and in certain cases, can induce defects during laying of decoration (silk screen process, labelling, hot marking) and therefore degrade the appearance of this decoration.

In order to palliate these disadvantages, the invention also proposes a process which makes it possible to considerably attenuate the weld lines while keeping the necessary support of the insert on the nozzle receiver.

This process and this mold will now be described in reference to FIGS. 8 and 9. As represented in FIGS. 8 and 9, this process consists of placing the injection point noted 13 in a plane situated below the upper part of the head of the tube at point of connection A between feed channels 10 and the head of the tube.

By placing injection point 13 in a plane situated below the part at the top of the head of the tube at the point of connection A between feed channels 10 and the head of the tube, the stream of injected material travels a route characterized by an angle, noted a in FIG. 9, less than 90°.

The injected material therefore strikes the side (vertical in FIG. 9) of the upper part of the head of the tube, which, from point of connection A, promotes a circular flow path, represented by arrows 15 in FIG. 8 and in FIG. 10, which allows the reconstitution of an annular stream of the injected material and considerably attenuates the creation of weld lines on the skirt. Thus, a mold for implementation of the process of the invention will include cavity insert 5, stationary insert 4 having central part 8 of which free upper part 9 is in the shape of a reentrant cone with respect to the insert.

In order to facilitate reconstitution of a circular stream of material from the points of connection between the radial injection channels and the upper part of the head of the tube, there is an advantage in forming the widest possible line of connection between each radial injection channel and the upper part of the head of the tube in accordance with FIG. 10.

An advantageous solution consists of providing total widths of connection of the feed channels at the point of connection A with the upper part of the head of the tube, which represent at least 15% of the perimeter of the upper part of the head of the tube.

Another solution which further improves the annular feed but which reduces the area of support of the insert at the nozzle receiver consists of bringing the total widths of connection of the feed channels at the point of connection with the head of the tube to more than 25% of the perimeter of the upper part of the head.

In order to keep a maximum area of support of the insert at the nozzle receiver while maximizing the total widths of connection A of radial feed channels 10 with the head of the tube, it is advantageous to give the radial channels a width which increases from injection point 13 to point of connection A with the head of the tube, as shown in FIG. 10.

Furthermore, still in order to promote reconstitution of an annular flow of material, it is advantageous to provide annular zone of narrowing Z formed on the vertical side of the end piece, at the entrance of the upper part of the head of the tube, after the zone of connection with the radial feed channels.

The annular narrowing zone formed at the entrance of the upper part of the head of the tube after point of connection A of the radial channel and the wall of the tube reinforces the effect of annular spreading of the stream of material which is sketched in FIG. 10.

Inasmuch as the narrowing plays no part in the centering of the insert on the cavity insert, and as it is necessary to affect the whole very small surface of the end of the end piece with the feed stream as well as the zones of support of the insert on the mold, and finally as it is necessary to avoid any loss of load before constitution of the annular stream on the vertical side of the end piece, it is very important not to arrange the narrowing zone on the top, that is to say on the basin itself.

Furthermore, in order to avoid any manual, mechanical tearing or tearing by stress cracking, and in order to avoid any loss of load, the narrowing zone must be sufficiently thick, with a thickness at least greater than the thickness of the wall of the skirt of the tube.

Finally, central insert 8 can be made mobile in insert 4. This arrangement is advantageously used when one does not wish to connect a "reducer" end piece on the tube, reducer which is then constituted by the top summit wall of the head of the tube. This wall is injected after the injection of the skirt and without interruption, after movement of the central insert back proportionally to the desired wall thickness of the reducer. After this operation, one has a single-piece tube injected in a single operation, the reducer being produced in the form of a basin, free upper part 9 of central part 8 of the insert being designed in the shape of a reentrant cone, the basin having an external surface which is completely smooth up to the edge of the vertical side of the end piece, the cavity being designed without radial or circular unevenness, and the feed channels being designed in the form of hollows in the mobile part of the insert according to FIG. 7.

With the basin hermetically closing the tube, the opening hole is obtained by perforation a posteriori, the diameter of the hole being modulated to the desired size, taking into account the cream contained in the tube.

Of course, although the invention has been described for the injection of the particular materials described here, by the process and with the injection mold which are described here, it will be clearly apparent to the expert in the field that the flexible tube obtained by injection of an ethylene-$C_4$ to $C_{10}$ olefin copolymer can be obtained by other processes and will still be in the scope of the invention as defined in the claims. Likewise, the process and the injection mold described here can be used to inject viscous materials other than those described here.

Thus, the invention is in no way limited to the embodiments described and illustrated in the preceding description and covers all embodiments falling within the scope of the invention as defined in the appended claims.

The invention claimed is:

1. A tube comprising a skirt and a distribution head, the skirt including a wall made of an ethylene-linear $C_{4\ to\ 10}$ olefin copolymer or of a mixture of ethylene-linear $C_{4\ to\ 10}$ olefin copolymers having a fluidity index measured according to the ISO 1133 standard of between 3 and 10 g/10 min inclusive, and a density between 0.880 g/cm$^3$ and 0.935 g/cm$^3$ inclusive, wherein the thickness of the wall of the skirt is constant in a radial sectional plane;
the skirt having a wall thickness at mid-height between 0.30 and 1.00 mm inclusive, and a length between 40 and 200 mm inclusive,
wherein the skirt and the distribution head are manufactured by injection in an injection mold, the mold having a cavity insert and an additional insert, said additional insert having a central part including a free upper end, the end resting centered on the cavity insert during the injection of the tube.

2. The tube according to claim 1, wherein the mixture of ethylene-linear $C_{4\ to\ 10}$ olefin copolymers is either a mixture of ethylene-linear $C_{4\ to\ 5}$ olefin copolymers or a mixture of ethylene-linear $C_{6\ to\ 10}$ olefin copolymers.

3. The tube according to claim 1., wherein the ethylene-linear $C_{4\ to\ 10}$ olefin copolymer(s) is(are) ethylene-octene copolymer(s).

4. The tube according to claim 1, wherein the free upper end of insert has feed channels.

5. The tube according to claim 4, wherein the free upper end is in the shape of a reentrant cone, the end including angles α between the feed channels and the vertical axis of the cavity insert of less than 90°.

6. The tube according to claim 4, wherein the distribution head has an end piece and the feed channels have zones of connection with the end piece of distribution head, the feed channels having total widths at their zones of connection with the end piece representing at least 15% of the perimeter of the end piece.

7. The tube according to claim 4, wherein the distribution head has an end piece and the feed channels have points of connection with the end piece, the feed channels having a width which increases from an injection point according to a centrifugal radial direction to the points of connection with the end piece.

8. The tube according to claim 7, wherein the end piece has an annular zone of narrowing beyond the point of connection of the feed channels with the end piece.

9. The tube according to claim 1, wherein the central part of the additional insert is mobile, and the distribution head includes an upper wall that is injected after movement of central part back a distance which is proportional to the desired wall thickness.

10. The tube according to claim 1, wherein the fluidity index of the ethylene-linear $C_{4\ to\ 10}$ olefin copolymer or mixture of these copolymers is between 5 and 10 g/10 min inclusive, and the thickness of the wall at mid-height of the skirt is situated on the curve represented in FIG. 2, as a function of the length of the skirt, + or −0.05 mm, the tube having improved flexibility.

11. The tube according to claim 1, wherein the fluidity index of the ethylene-linear $C_{4\ to\ 10}$ olefin copolymer or mixture of copolymers is between 3 and 6.5 g/10 min inclusive, and the thickness of the wall at mid-height of the skirt is situated on the curve represented in FIG. 3, as a function of the length of the skirt, + or−0.05 mm, the tube having improved resistance to stress cracking.

12. The tube according to claim 1, wherein the density of the ethylene-linear $C_{4\ to\ 10}$ olefin copolymer or mixture of copolymers is between 0.880 and 0.920 g/cm$^3$ inclusive, the tube having improved flexibility.

13. The tube according to claim 12, wherein the skirt has a length greater than or equal to 75 mm.

14. The tube according to claim 10, wherein the fluidity index of the ethylene-linear $C_{4\ to\ 10}$ olefin copolymer or mixture of copolymers is between 5 and 10 g/10 min, and the density of the ethylene-linear $C_{4\ to\ 10}$ olefin copolymer or mixture of copolymers is between 0.900 and 0.920 g/cm$^3$ inclusive.

15. The tube according to claim 12, wherein the wall is made of an ethylene-octene copolymer with a fluidity index between 5 and 6 g/10 min inclusive and a density of 0.919 g/cm$^3$.

16. The tube according to claim 1, wherein the density of the ethylene-linear $C_{4\ to\ 10}$ olefin copolymer or mixture of copolymers is
between 0.925 and 0.935 g/cm$^3$ inclusive for a thickness of the wall at mid-height of the skirt close to 0.45 mm;
between 0.920 and 0.930 g/cm$^3$ for a thickness of the wall at mid-height of the skirt close to 0.60 mm;
between 0.915 and 0.925 g/cm$^3$ for a thickness of the wall at mid-height of the skirt close to 0.75 mm; the tube having reinforced impermeability to water vapor.

17. The tube according to claim 16, wherein the its wall is made of a mixture of:
a) 33 to 67 wt %, with respect to the total weight of the mixture, of an ethylene-linear $c_{4\ to\ 10}$ olefin copolymer having a density between 0.900 and 0.920 g/cm$^3$ inclusive, and
b) 67 to 33 wt %, with respect to the total weight of the mixture, of an ethylene-linear $C_{4\ to\ 10}$ olefin copolymer having a density between 0.920 and 0.935 g/cm$^3$ inclusive.

18. The tube according to claim 17, wherein the wall is made of a mixture of:
a) 33 to 67 wt %, with respect to the total weight of the mixture, of an ethylene-octene copolymer having a fluidity index between 3 and 6.5 g/10 min inclusive and a density between 0.900 and 0.920 g/cm$^3$ inclusive, and
b) 67 to 33 wt %, with respect to the total weight of the mixture, of an ethylene-octene copolymer having a fluidity index between 3 and 6.5 g/10 min inclusive and a density between 0.920 and 0.935 g/cm³ inclusive, the tube having improved resistance to stress cracking with reinforced impermeability to water vapor.

19. The tube according to claim 18, wherein the wall is made of a mixture of:
   a) 33 to 67 wt %, with respect to the total weight of the mixture, of an ethylene-octene copolymer having a fluidity index between 5 and 6 g/10 min and a density equal to 0.919 g/cm³, and
   b) 67 to 33 wt %, with respect to the total weight of the mixture, of an ethylene-octene copolymer having a fluidity index between 3 and 4 g/10 min and a density equal to 0.935 g/cm³.

20. The tube according to claim 19, wherein each ethylene-octene copolymer represents 50 wt % of said mixture.

21. The tube according to claim 18, wherein the its wall is made of a mixture of:
   a) 33 to 67 wt %, with respect to the total weight of the mixture, of an ethylene-octene copolymer having a fluidity index between 3 and 5 g/10 min and a density equal to 0.915 g/cm³, and
   b) 67 to 33 wt %, with respect to the total weight of the mixture, of an ethylene-octene copolymer having a fluidity index between 3 and 4 g/10 min and a density equal to 0.935 g/cm³.

22. The tube according to claim 1, wherein the fluidity index is between 3.5 and 9 g/10 min inclusive.

23. The tube according to claim 1, wherein the thickness of the wall of the skirt is constant in a radial sectional plane along the longitudinal axis of the tube.

* * * * *